Patented Oct. 19, 1948

2,451,459

UNITED STATES PATENT OFFICE 2,451,459

COMBUSTION AIR FLOW RESPONSIVE CARBURETING APPARATUS

Lynn A. Williams, Jr., Northfield, Ill., assignor to Stewart-Warner Corporation, Chicago, Ill., a corporation of Virginia Application June 23, 1944, Serial No. 541,827

3 Claims. (Cl. 158—28)

My invention relates generally to carbureting apparatus, and more particularly to improved means for controlling the flow of fuel to a fuel consuming device, such as a heater or internal combustion engine, in response to the mass flow rate of the air which is to be mixed with the fuel for combustion.

It is desirable to control the rate at which fuel is supplied to apparatus in which it is burned in accordance with the rate at which the combustion air is supplied, so as to maintain a substantially uniform fuel-air ratio in the mixture. In some types of fuel-burning apparatus, the mass rate of air flow varies considerably as, for example, in apparatus used on aircraft, particularly when the combustion air is supplied by means of a ram or scoop. In such apparatus the mass rate of combustion air flow may vary widely, with the speed of flight as well as with the altitude, that is, the density of the air.

It is the primary object of my invention to provide an improved carbureting apparatus in which the rate of mass flow of air for combustion is utilized as the controlling factor in adjusting the rate of fuel supply.

A further object is to provide an improved electrical means responsive to the rate of mass flow of combustion air for controlling the rate of fuel supply.

A further object is to provide an improved fuel flow controlling apparatus for fuel consuming apparatus, which is responsive to the rate of mass flow of combustion air, and which operates in a simple manner to effect a highly sensitive control of the fuel supply, at low as well as high air flow rates.

Other objects will appear from the following description, reference being had to the accompanying drawings, in which.

Figure 1:
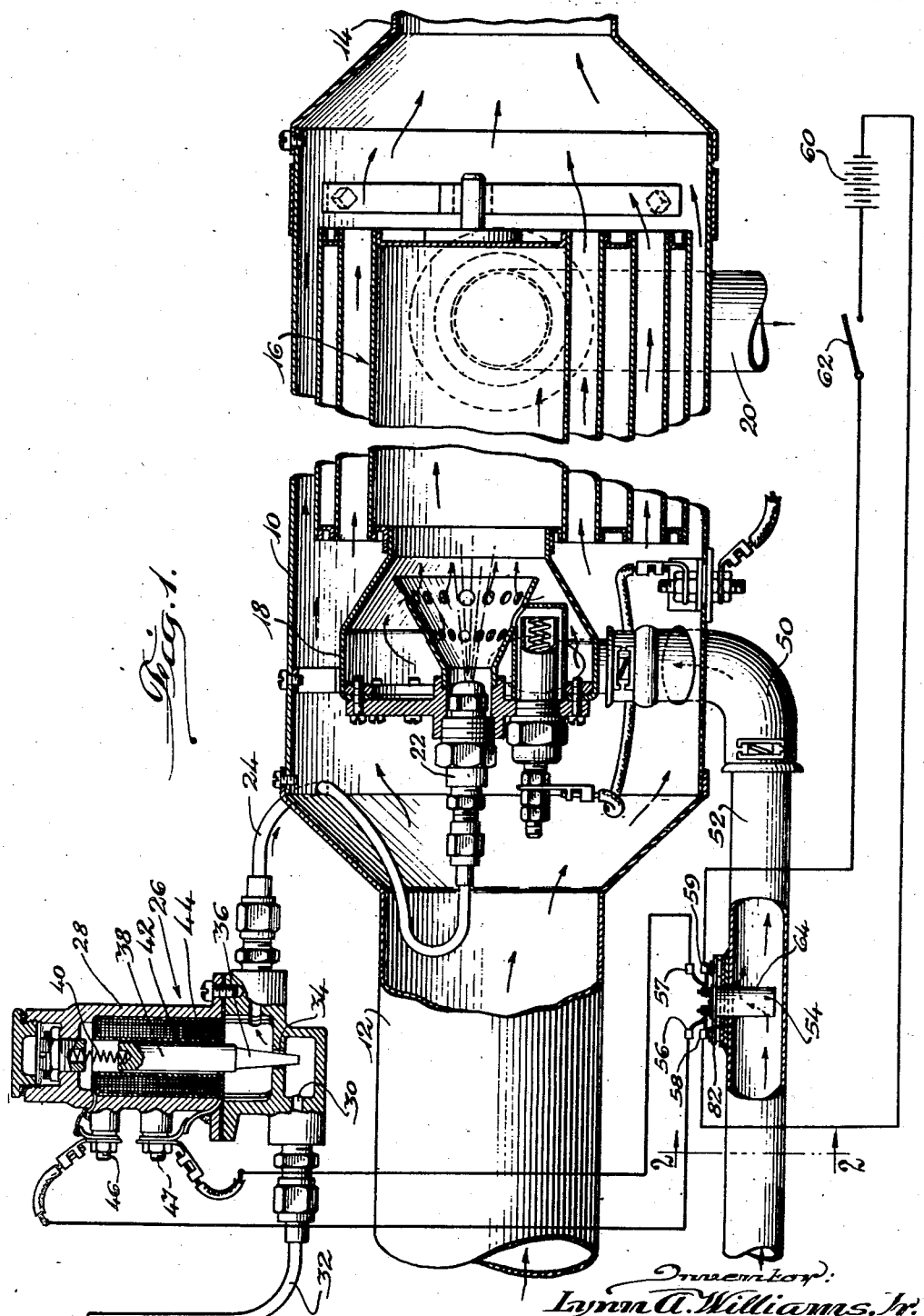
Fig. 1 is a fragmentary longitudinal sectional view of an aircraft heater embodying the improved carbureting apparatus of the invention.

In Fig. 1, the invention is illustrated as forming part of an aircraft heater comprising a casing 10 through which air flows from an inlet conduit 12, being conducted to the space to be heated through an outlet conduit 14. Within the casing 12 is a heat exchanger 16 connected to a combustion chamber head 18, the burning gases and products of combustion from the combustion chamber flowing through suitable passageways in the heat exchanger 16, and being discharged to the atmosphere through an exhaust conduit 20. Fuel is supplied to the combustion chamber head 18 through a nozzle 22 connected by a suitable conduit 24 with an electromagnetic fuel valve structure 26.

The valve structure 26 comprises a suitable body 28 having a fuel inlet port 30 connected by a conduit 32 to a suitable supply of fuel under constant pressure. The body includes a metering port 34, the flow through which is controlled by a tapered valve 36 formed at the end of a solenoid plunger 38. The plunger is normally urged downwardly by an adjustable spring 40 and is reciprocable within a suitable nonmagnetic cylindrical guide 42 which is surrounded by a solenoid coil 44. The valve structure 26, as a whole, is hermetically sealed, the terminals of the solenoid winding 44 being connected to binding posts 46, 47, which are suitably insulated from one another. If desired, the upper portion of the valve body may be formed of a suitable insulating plastic material, thereby facilitating the insulation of the conductors connecting the ends of the winding 44 with the binding posts 46, 47.

Air for combustion is supplied to the combustion chamber head 18 through suitable conduit connections including an elbow 50 and a pipe 52, the latter being connected to a suitable source of air under pressure, such as an air scoop or ram, or a mechanically operated blower. Projecting into the pipe 52 is a device 54 which is responsive to the rate of mass flow of air through the pipe 52. The device 54 has terminals 56, 57, which are respectively connected to a source of energizing current, illustrated as a battery 60, through a manually operable switch 62.

Figure 2:
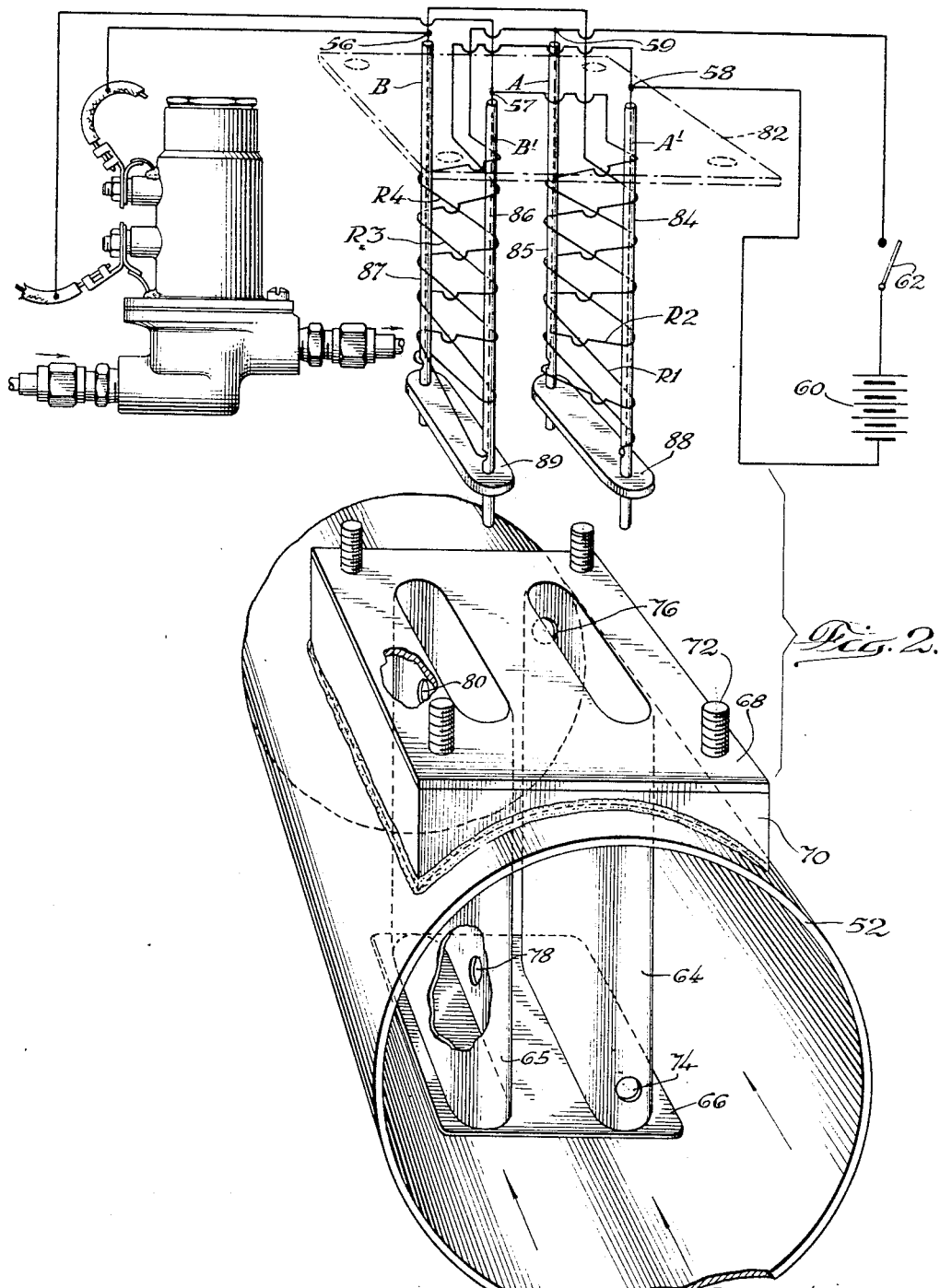
Fig. 2 is a diagrammatic view showing the elements of the rate of air mass flow responsive means in an exploded view, and showing the electric circuit connections diagrammatically.

The device 54 is shown in greater detail in Fig. 2 as comprising a pair of casings 64, 65, the inner ends of which are closed by a plate 66 and the outer ends of which are secured to a plate 68. The casings 64, 65, project into the pipe 52 through a suitable opening formed therein and are secured to a mounting 70 (the latter being welded to the pipe 52), by studs 72. The casing 64 is provided with an inlet opening 74 facing in the upstream direction and an opening 76 facing downstream, considering the flow to be in the direction indicated by the arrows in Fig. 2.

The casing 65 has a pair of openings 78 and 80 parallel to the direction of air flow through the pipe 52, being thus subjected only to the static air pressure. As a result, air flow through the casing 65 will be limited almost entirely to that produced by natural convection effects resulting from the heating of the resistors R3 and R4 so that the flow through this casing will be at a constant relatively slow rate, whereas air flow through the casing 64 will be at a rate responsive to the velocity of the flow of the air through the pipe 52.

Suitably secured to a cover plate 82 are four tubular supports 84, 85, 86, and 87, the supports 84 and 85 being joined at their inner ends by an insulating connector strip 88, while the supports 86 and 87 are similarly connected by a strip 89.

A wire R1, preferably of iron or other metal or alloy having a high temperature coefficient of resistivity, is suitably supported on the frame provided by the tubular supports 84 and 85, the ends of the wire R1 being connected respectively to the terminals 56 and 59. Also wound around the supports 84, 85, but insulated from the resistance wire R1, is a second similar resistance wire R2, the ends of which are connected respectively to the terminals 57 and 58. In a similar manner, a resistance wire R3 is carried by the tubular supports 86 and 87, and has its ends connected to the terminals 56 and 58. A resistance wire R4 is wound around the tubular supports 86 and 87, and is connected between the terminals 57 and 59.

It will thus be seen that the resistance wires R1, R2, R3, and R4, form four legs of a Wheatstone bridge in which opposite legs comprise resistances R1 and R2 located in the casing 64, while the other opposite legs R3 and R4 are located in the casing 65. The terminals 58 and 59 constitute the input terminals of the bridge, while the terminals 56 and 57 form the output terminals thereof. The resistances R1 to R4 are of sufficiently low value that substantial current will flow through them at all times, and that the $I^2R$ loss through them will be sufficient to maintain the wires at a temperature within the range at which the temperature coefficient of resistivity is relatively high. The normal operating temperature of the wires R1 to R4 should not be so high that oxidation takes place rapidly.

Upon closure of the switch 62, the resistances R1 to R4, which for the sake of convenience may be of equal length and initial resistance, will be heated due to the $I^2R$ losses. If there is no air flow through the pipe 52, the voltage drop across the resistors R1 to R4 will be equal, and hence there will be zero potential across the output terminals 56, 57. Assuming, however, that combustion air is being supplied through the pipe 52, the wires R1 and R2 will be prevented from rising to as high a temperature as the wires R3 and R4, since, in addition to circulation of air through the casing 64 due to convection, there will be additional air flow through the casing 64 due to the dynamic pressure of the air at the inlet 74 and the somewhat lowered air pressure at the downstream facing outlet 76. As a result, the resistance of wires R3 and R4 will be higher than that of the wires R1 and R2. A potential will therefore exist across the output terminals 56 and 57 which will vary with the difference in the temperatures of the resistors R1 and R2 on the one hand, and of R3 and R4 on the other hand.

Assuming that the resistance wires R1 to R4 are heated to a temperature at which the temperature-specific resistance curve of the iron wire used is approximately linear, it will be clear that the voltage across the output terminals 56, 57 of the bridge circuit will vary substantially directly as the temperature difference between resistors R1, R2 and R3, R4. By proper design of the openings 74, 76 and 78, 80, the voltage across the output terminals 56, 57 may be made to vary substantially linearly, or in nearly any desired predetermined manner, with the changes in mass flow of air through the pipe 52. Thus the magnetic pull upon the plunger 38 of the solenoid fuel valve structure 26 will correspondingly vary, and the flow of fuel through the valve port 34 may likewise be designed to vary substantially linearly with the rate of mass flow of air through the combustion air supply pipe 52.

By correlative design of the openings in the casings 64, 65, in the specific resistance of the resistance wires R1 to R4, in the variation in magnetic pull on the plunger 38 with variations in current flow through the solenoid winding 44, and in the shape of the valve portion 36 of the plunger 38, the rate of fuel flow to the nozzle 22 may be made to vary substantially linearly with respect to the rate of mass flow of combustion air into the combustion chamber, so that a proper fuel-air ratio will be maintained despite wide variations in the altitude and air speed of the airplane.

Figure 3:
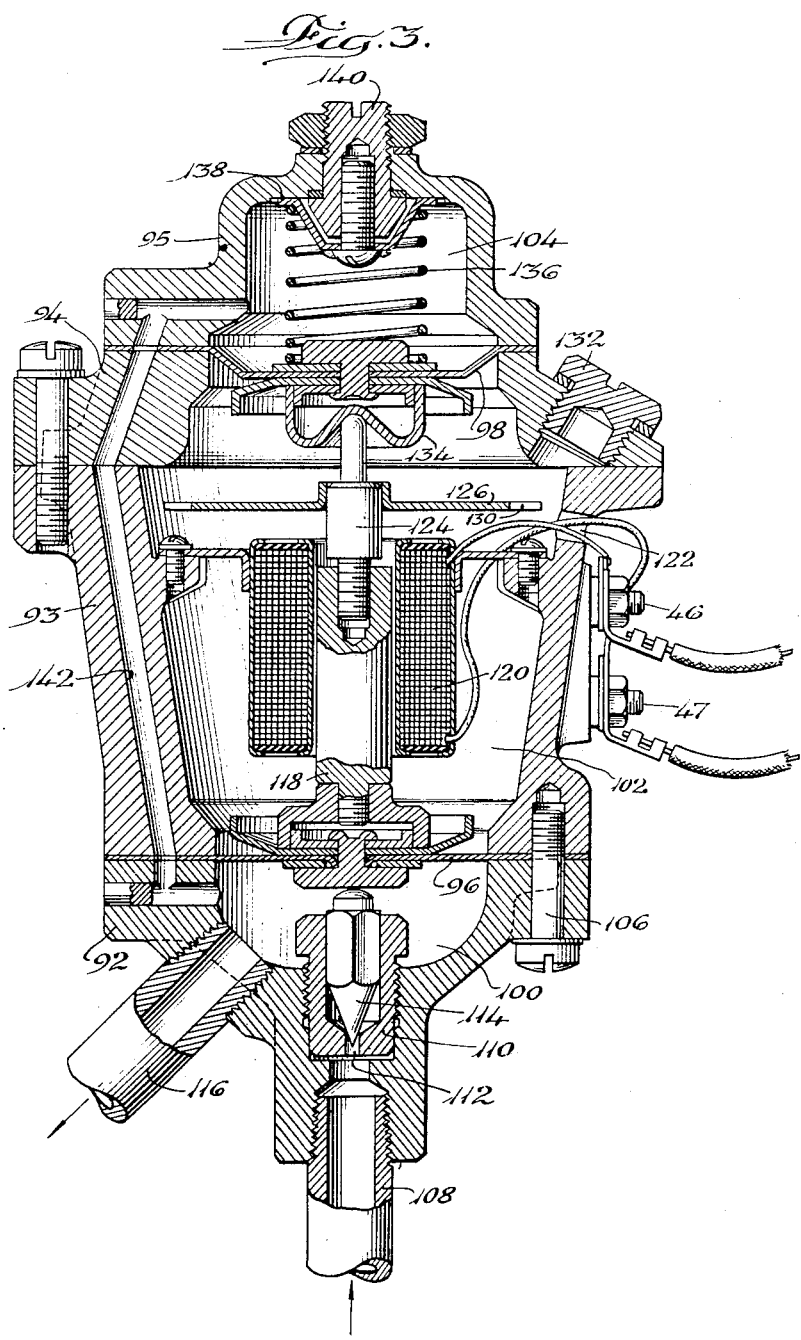
Fig. 3 is a central vertical sectional view of a modified form of the fuel flow rate controlling valve.

In place of the simple solenoid valve structure 26 shown in Fig. 1, the balanced valve structure of Fig. 3 may be employed, especially in installations where a suitable source of fuel under regulated pressure is not available.

In Fig. 3, the valve structure is shown as comprising four body castings 92, 93, 94, and 95, and provided with diaphragms 96 and 98 dividing the interior of these castings into a fuel chamber 100, a solenoid chamber 102, and a compensating chamber 104. The diaphragms 96 and 98 are suitably clamped between the castings 92, 93 and 94, 95, respectively, the castings being suitably secured together, as by cap screws 106. Fuel under pressure is supplied through a conduit 108 threaded in the casting 92, and enters the fuel chamber 100 through a valve bushing 110 having a valve port 112 with which a conical needle valve 114 is cooperable. The upper portion of the valve 114 is of polygonal cross section so as to provide passageways for the flow of fuel. Fuel is discharged from the chamber 100 through a conduit 116, which leads to the burner nozzle of a heater, or to any other apparatus to which fuel is to be supplied at a regulated rate. In each case the conduit 116 should include or terminate at a metering restriction so that there will always be substantial back pressure in the fuel chamber 100.

Suitably connected to the diaphragm 96 is a solenoid plunger 118 which is reciprocable in the solenoid winding 120, the latter being suitably fixed to the casting 93 within the chamber 102. The terminal conductors of the winding 120 pass through the wall of the casting 93 through an opening 122, which also serves to maintain the chamber 102 at atmospheric pressure.

An adjusting stud 124 is threaded in the solenoid plunger 118 and has a disc 126 secured thereto, this disc having a plurality of peripheral notches 130. Upon removal of a plug 132 and the utilization of a suitable tool, such as a small screw driver, the disc 126 may be rotated for adjustment purposes. Stud 124 has its upper end seated in a socket 134 suitably secured to the diaphragm 98. A spring 136 is compressed between the diaphragm 98 and a suitable spring seat member 138 secured to an adjusting screw 140.

A passageway 142 is provided by suitable successively registering holes in the castings 92, 93, 94, and 95, so as to provide free communication between the fuel chamber 100 and the compensating chamber 104. Except for the fact that the effective area of the diaphragm 98 is somewhat greater than that of the diaphragm 96, it will be clear that the fuel pressure above the diaphragm 98 balances that below the diaphragm 96. The diaphragm 98 is, however, made slightly of greater diameter than the diaphragm 96, and is mounted in such manner that its effective area decreases as the central portion of the diaphragm moves downwardly.

When the solenoid 120 is not energized, it will be apparent that the valve 114 will remain closed due to the force of the relatively light spring 136, and due to the fact that the effective area of the diaphragm 98 is slightly greater than that of the diaphragm 96. As soon, however, as the solenoid 120 is energized, due to an unbalance in the bridge circuit comprising resistance wires R1 to R4, the force of the spring 136 and the differential action of the diaphragms 96 and 98 will be overcome, and the diaphragm 96 will be moved upwardly sufficienctly to permit flow of fuel past the needle valve 114. As the potential across the output terminals of the bridge circuit comprising the wires R1 to R4 increases, due to increased rate of mass flow of air through the pipe 52, the resultant increased current flow through the solenoid winding 120 will cause the plunger 118, and parts connected therewith, to move upwardly to an increased extent against the increased compression of spring 136 and the increased force applied by the diaphragm 98 as its effective area increases, thereby increasing the opening of the valve 114. In this way the flow of fuel is regulated in response to the rate of mass flow of air through the pipe 52 so that a proper fuel-air mixture, suitable for complete combustion in the heater, is maintained.

While I have shown and described particular embodiments of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In the combination comprising a liquid fuel burning device, a combustion air supply conduit and a fuel line for said device, an electrically operated valve for modulating the rate of flow of fuel through said line in response to a varying electrical potential, electric circuit means for varying the potential at said fuel control valve, and the last said means including electrical resistors responsive to the cooling effect of the air flowing through said conduit, the improvement in said electric circuit which comprises a bridge circuit, a resistor element in said bridge circuit and means associated with said resistor element to cause air to flow in contact therewith when air flows through said conduit such that the mass rate of flow of air in contact with said resistor element is a function of the mass rate of flow of air through said conduit, a second resistor element in said bridge circuit and means associated with said second resistor element to pass air from said conduit in contact with said second resistor at a substantially constant rate regardless of the rate of flow through said conduit, and said second resistor being arranged in opposition to the first said resistor in said bridge circuit.

2. A bridge circuit device for providing an electrical potential bearing a definite relation to the rate of mass flow of variable temperature fluid through a conduit comprising a bridge circuit which includes two pairs of conductors having a high temperature coefficient of resistivity, said pairs of conductors being in opposite legs of said bridge circuit, means subjecting one pair of said conductors to the static cooling effect of the fluid in the conduit including a casing for said pair of conductors located within the conduit and having an inlet opening and an outlet opening both disposed in planes substantially parallel to the direction of flow in the conduit, said pair of conductors acting to compensate for ambient temperature, means subjecting the other pair of conductors to the dynamic cooling effect of the fluid in the conduit including a casing for said conductors having an inlet opening and an outlet opening disposed in the walls of the casing which face upstream and downstream respectively, a source of electrical energy connected to the input terminals of said bridge circuit and an electrically actuated control device connected across the output terminals of said bridge circuit and responsive to variations in potential across said output terminals.

3. A bridge circuit device for providing an electrical potential bearing a definite relation to the rate of mass flow of variable temperature fluid through a conduit comprising a bridge circuit which includes two pairs of conductors having a high temperature coefficient of resistivity, said pairs of conductors being in opposite legs of said bridge circuit, means subjecting one pair of said conductors to the static cooling effect of the fluid in the conduit including a casing for said pair of conductors located within the conduit and having an inlet in the lower portion of one side wall and an outlet in the upper portion of the opposite side wall, said pair of conductors acting to compensate for ambient temperature, means subjecting the other pair of conductors to the dynamic cooling effect of the fluid in the conduit including a casing for said conductors having an inlet in the lower portion of one end wall and an outlet in the upper portion of the opposite end wall, both of said casings being relatively narrow transversely of the direction of flow and elongated in the direction of flow with said conductors supported with said casings and wound in relatively flat coils exposing their surfaces principally in planes parallel to said direction of flow, a source of electrical energy connected to the input terminals of said bridge circuit, and an electrically actuated control device connected across the output terminals of said bridge circuit and responsive to variations in potential across said output terminals.

LYNN A. WILLIAMS, Jr.

REFERENCES CITED

The following references are of record in the file of this patent:

UNITED STATES PATENTS

| Number | Name | Date |
| --- | --- | --- |
| 1,437,611 | Packard | Dec. 5, 1922 |
| 1,437,626 | Wilson | Dec. 5, 1922 |
| 1,691,600 | Brush | Nov. 13, 1928 |
| 1,724,296 | MacGregor-Morris | Aug. 13, 1929 |
| 1,726,721 | Schullstrom | Sept. 3, 1929 |
| 2,112,750 | Price | Mar. 29, 1938 |
| 2,214,181 | Rylsky | Sept. 10, 1940 |